(12) United States Patent
Schleif et al.

(10) Patent No.: US 7,267,464 B2
(45) Date of Patent: Sep. 11, 2007

(54) APPARATUS AND A METHOD FOR ASSESSING VISIBILITY OF A CHILD RESTRAINT ANCHORAGE

(75) Inventors: Kurt Schleif, Dearborn, MI (US); Robert Michel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 383 days.

(21) Appl. No.: 10/904,604

(22) Filed: Nov. 18, 2004

(65) Prior Publication Data

US 2006/0102411 A1 May 18, 2006

(51) Int. Cl.
*B60Q 1/00* (2006.01)

(52) U.S. Cl. .................... 362/488; 362/131; 297/217.6

(58) Field of Classification Search ................ 362/488, 362/131; 297/217.3, 217.6
See application file for complete search history.

(56) References Cited

U.S. PATENT DOCUMENTS 6,126,233 A * 10/2000 Gaetano et al. .......... 297/217.6

* cited by examiner

*Primary Examiner*—Ali Alavi
*Assistant Examiner*—William J. Carter
(74) *Attorney, Agent, or Firm*—Frank A. MacKenzie; Brooks Kushman P.C.

(57) ABSTRACT

An apparatus for assessing visibility of an anchorage disposed proximate a vehicle seat. The apparatus includes a mounting assembly adapted to engage a first anchorage and a laser adapted to project a beam toward a second anchorage. The mounting assembly is pivotable about the first anchorage to adjust an angle at which the beam is projected toward the second anchorage.

20 Claims, 3 Drawing Sheets

APPARATUS AND A METHOD FOR ASSESSING VISIBILITY OF A CHILD RESTRAINT ANCHORAGE

BACKGROUND OF THE INVENTION

1. Field of the Invention

The present invention relates to an apparatus and a method for assessing visibility of an anchorage of a child restraint anchorage system of a vehicle.

2. Background Art

Motor vehicles may include a child restraint anchorage system. A child restraint anchorage system uses a plurality of anchorages to transfer loads from a child safety seat to the vehicle structure. Such anchorages may be located where they are partially concealed by or recessed from one or more surfaces of the vehicle, such as the exterior surfaces of a vehicle seat. Manufacturer, industry, or government standards, such as Federal Motor Vehicle Safety Standard (FMVSS) 225 may require that an indicator mark be employed to conspicuously identify the location of an anchorage if it is not visible from a predetermined angle or position. Such indicator marks increase manufacturing costs. Consequently, it is desirable to accurately determine whether an anchorage is visible to avoid the unnecessary installation of an indicator mark.

Before applicant's invention, there was a need for an apparatus and a method for accurately assessing the visibility of an anchorage of a child restraint anchorage system. In addition, there was a need for an apparatus and a method that could be used with various child restraint anchorage designs and configurations. Moreover, there was the need for an apparatus that could be easily reconfigured to accommodate different anchorage positions and seat designs. In addition, there was the need for an apparatus that could assess anchorage visibility without altering adjacent vehicle surfaces or affecting anchorage visibility. Problems associated with the prior art as noted above and other problems are addressed by applicant's invention as summarized below.

SUMMARY OF THE INVENTION

According to one aspect of the present invention, an apparatus for assessing visibility of an anchorage disposed proximate a vehicle seat is provided. The apparatus includes a mounting assembly and a laser. The mounting assembly is adapted to engage a first anchorage. The laser is adapted to project a beam toward a second anchorage and is disposed proximate the mounting assembly. The mounting assembly is pivotable about the first anchorage to adjust an angle at which the beam is projected toward the second anchorage. The apparatus permits anchorage visibility to be accurately assessed without altering adjacent vehicle seat surfaces.

The mounting assembly may include a slot adapted to receive the first anchorage. The slot may have a linear configuration or may include a hook portion having a different orientation than an adjacent portion of the slot. The slot and/or hook portion permit the apparatus to be used with a variety of anchorage designs and configurations.

The mounting assembly may include a latch mechanism having a groove and a latch pin. The groove may be disposed proximate the slot. The latch pin may be moveably disposed in the groove. The latch pin may be adapted to move between a latched position in which the latch pin is disposed proximate the first anchorage and an unlatched position in which the latch pin is spaced apart from the first anchorage.

The mounting assembly may include a first level disposed along a first axis. The first level may be configured to indicate an orientation of the mounting assembly relative to a plane passing through the first and second anchorages. The mounting assembly may include a second level disposed along a second axis. The second level may be configured to indicate an orientation of the mounting assembly along the second axis. The mounting assembly may include an adjustment mechanism adapted to adjust the orientation of the first or second axes.

The laser may be a line generating laser configured to project a linear beam.

According to another aspect of the present invention, an apparatus for assessing visibility of an anchorage of a child restraint anchorage system disposed proximate a seat of a vehicle is provided. The apparatus includes a mounting assembly and a laser. The mounting assembly includes a first arm, a second arm, a laser mount, and an adjustment mechanism. The first arm has a slot configured to engage a first anchorage. The second arm is disposed proximate the first arm. The laser mount is disposed proximate the second arm. The adjustment mechanism is adapted to adjust the position of the laser mount relative to the first anchorage. The laser is disposed proximate the laser mount and is adapted to project a beam toward a second anchorage.

The adjustment mechanism may include first and second adjustment rods disposed proximate the second arm. The first and second adjustment rods may be adjustably positionable relative to the second arm and may have first and second end portions adapted to contact the seat.

The mounting assembly may include a first level and a second level. The first level may be configured to indicate an orientation of the second arm relative to a plane disposed parallel to the first and second anchorages.

The first arm may be adapted to rotate about a first axis of rotation. The laser may be configured to rotate about a second axis of rotation. The first arm and laser may be rotated about the first and second axes of rotation to reconfigure the apparatus such that the slot is configured to engage the second anchorage and the laser is configured to project a beam toward the first anchorage.

The first arm may include an arm engagement slot configured to receive the second arm. The mounting slot may include a pin and the second arm may include a hole adapted to receive the pin. Alternatively, the second arm may include a pin and the arm engagement slot may include a hole adapted to receive the pin. The pin and hole may cooperate to inhibit rotational movement of the second arm relative to the first arm.

According to another aspect of the present invention, a method for assessing the visibility of an anchorage of a child restraint anchorage system disposed on a vehicle with an apparatus is provided. The apparatus includes a mounting assembly adapted to engage a first anchorage and a laser adapted to project a beam toward a second anchorage. The method includes the steps of engaging the mounting assembly to the first anchorage, positioning the mounting assembly at a predetermined angle, projecting the beam toward the second anchorage, and determining whether the beam contacts the second anchorage. The second anchorage is visible from a predetermined angle if the beam contacts the second anchorage.

DETAILED DESCRIPTION OF THE PREFERRED EMBODIMENT(S)

Figure 1:
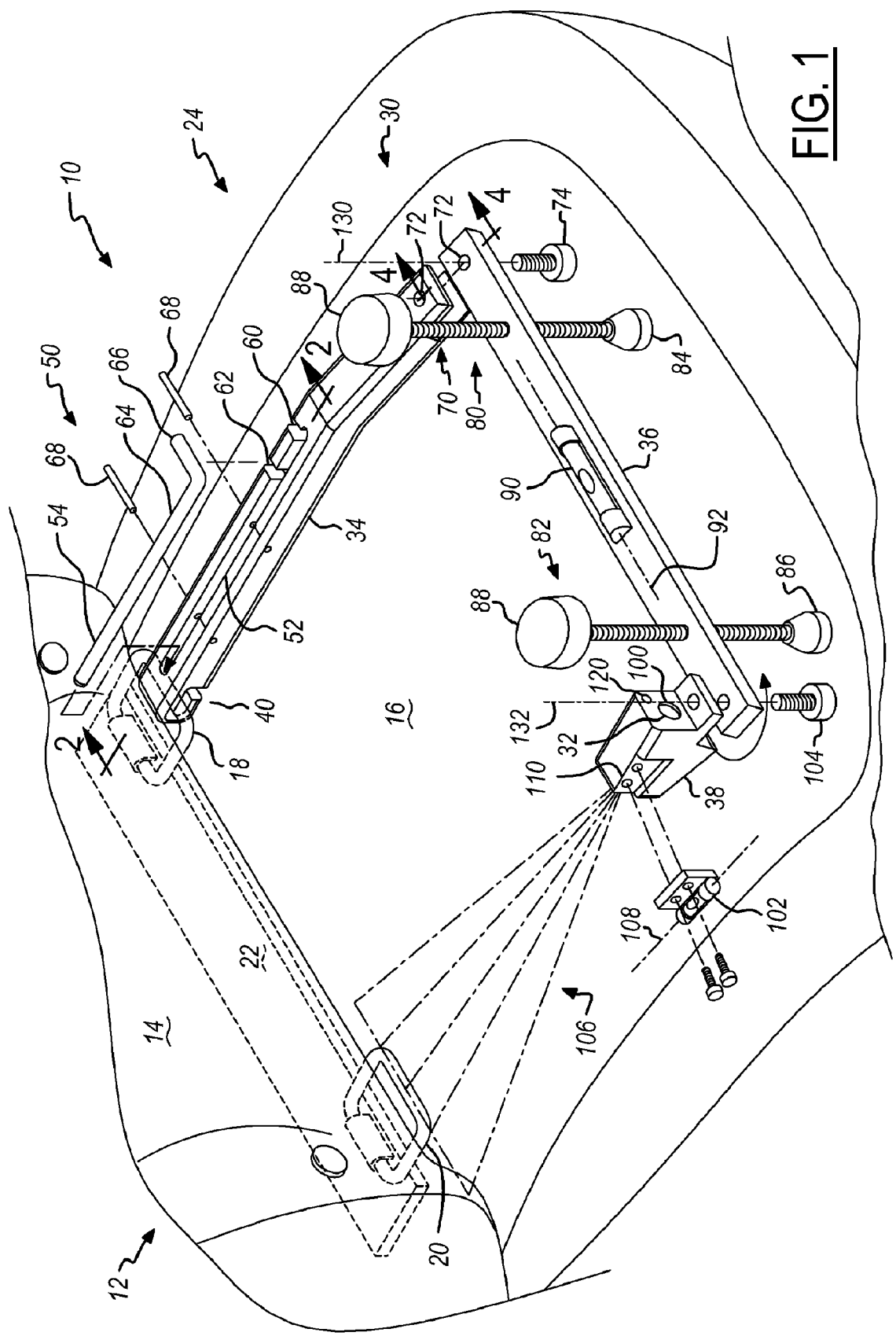
FIG. 1 is a perspective view of an apparatus for assessing visibility of an anchorage.

Referring to FIG. 1, a vehicle seat 10 and a portion of a child restraint anchorage system 12 are shown. The vehicle seat 10 includes a seat back 14 and a seat bottom 16. The child restraint anchorage system 12 includes one or more anchorages adapted to receive a component of a child restraint system, such as a mating feature of a child safety seat or a tether strap. The anchorages are adapted to transmit force from the child restraint system to the vehicle. In the embodiment shown, a first anchorage 18 and a second anchorage 20 are coupled to a bracket 22 that is attached to a portion of the vehicle. Alternatively, the bracket 22 may be omitted and the first and second anchorages 18,20 may be attached to another vehicle component, such as a vehicle seat frame.

The first and second anchorages 18,20 may be positioned between the seat back 14 and the seat bottom 16. In such a configuration, the first and/or second anchorages 18,20 may be partially concealed by a portion of the seat back 14. More specifically, the anchorages 18,20 may not be visible from various angles above a horizontal plane.

FIG. 1 also depicts an apparatus 24 for assessing the visibility of an anchorage. The apparatus 24 includes a mounting assembly 30 and a laser 32.

The mounting assembly 30 is adapted to engage an anchorage. In the embodiment shown in FIG. 1, the mounting assembly 30 is disposed on the seat bottom 16 and includes a first arm 34, a second arm 36, and a laser mount 38.

The first arm 34 may have any suitable configuration. In the embodiment shown, the first arm 34 is bent or angled to allow the laser 32 to project a beam at a desired angle as will be discussed in detail below.

Figure 2:
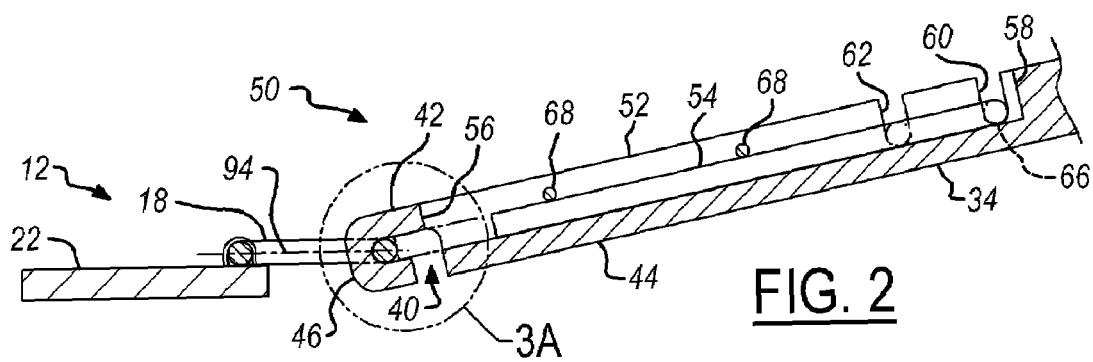
FIG. 2 is a section view of a portion of the apparatus along section line 2-2.

Referring to FIGS. 1 and 2, the first arm 34 includes a slot 40 adapted to receive the first or second anchorages 18, 20. The slot 40 may be disposed in any suitable location, such as proximate a top surface 42, bottom surface 44, or an end surface 46 of the first arm 34. In the embodiment shown, the slot 40 is disposed proximate the bottom surface 44. For convenience, the apparatus 24 will primarily be described below with a configuration such that the slot 40 engages the first anchorage 18.

Figure 3A:
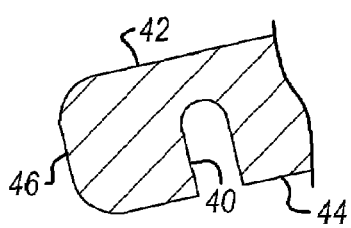
FIGS. 3A-3L are section views of various embodiments of a slot for engaging the anchorage.
Figure 3E:
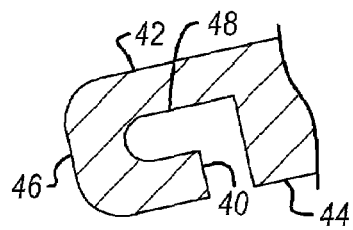
Figure 3I:
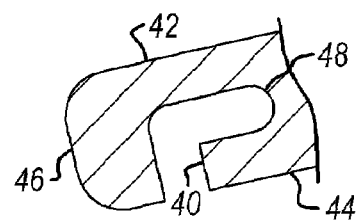
Figure 3B:
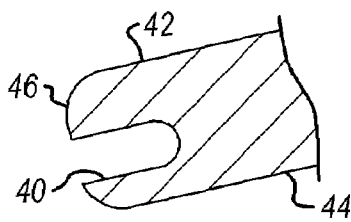
Figure 3F:
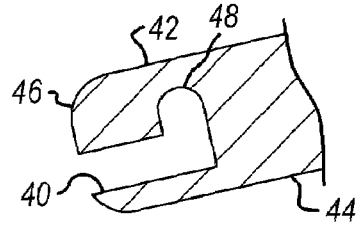
Figure 3J:
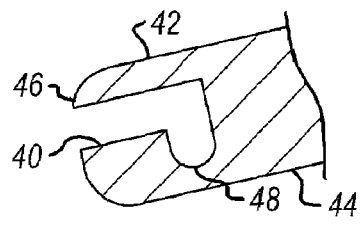
Figure 3C:
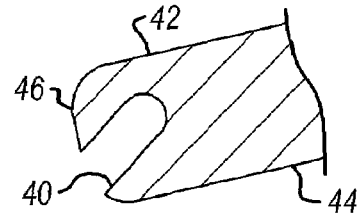
Figure 3G:
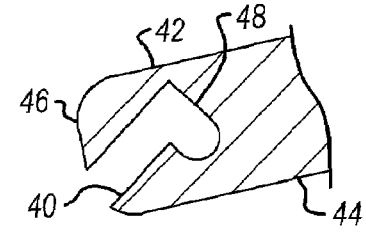
Figure 3K:
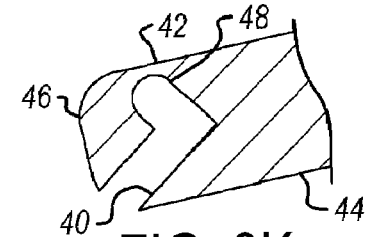
Figure 3D:
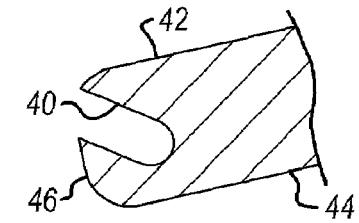
Figure 3H:
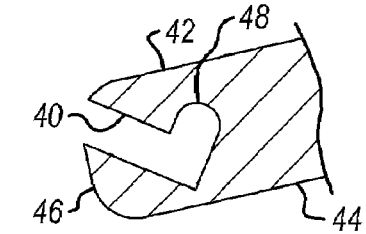
Figure 3L:
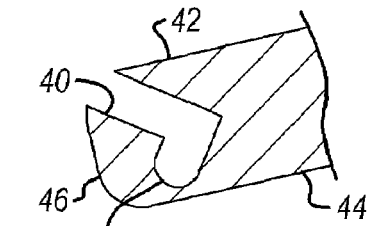

The slot 40 may have any suitable configuration. Referring to FIGS. 3A-3L, various slot embodiments are shown. In these Figures, reference numbers are repeated for convenience and clarity. In FIGS. 3A-3D, the slot 40 has generally linear configuration. Moreover, the slot 40 may be disposed perpendicular to a surface of the first arm 34 as shown in FIGS. 3A-3B or may be non-perpendicular as shown in FIGS. 3C-3D. Alternatively, the slot 40 may have a nonlinear configuration. For instance, the slot 40 may include a curved surface or may include hook portion 48 that is disposed in a different direction than an adjacent portion of the slot 40 as shown in FIGS. 3E-3L. The slot 40 and hook portion 48 facilitate engagement and seating against an anchorage. In addition, the slot 40 or hook portion 48 permit the apparatus 24 to be rotated about an anchorage to position the apparatus 24 as will be described in more detail below.

Referring again to FIGS. 1 and 2, the first arm 34 may include a latch mechanism 50 adapted to secure the mounting assembly 30 to an anchorage. The latch mechanism 50 includes a latch pin groove 52 and a latch pin 54.

The latch pin groove 52 is disposed in the first arm 34 and has a first end 56 and a second end 58. The first end 56 is disposed proximate the slot 40. The second end 58 is disposed opposite the first end 56. In addition, an unlatch groove 60 and a latch groove 62 are disposed proximate the latch pin groove 52. In the embodiment shown, the unlatch groove 60 is disposed proximate the second end 58 and the latch groove 62 is disposed between the unlatch groove 60 and the first end 56.

The latch pin 54 includes a body portion 64 and a handle portion 66. In the embodiment shown, the handle portion 66 is disposed at an angle to the body portion 64. The latch pin 54 is adapted to slide in the latch pin groove 52 between an unlatched position shown in solid lines in FIG. 2 and a latched position shown in phantom. The latch pin 54 is spaced apart from the anchorage 18 in the unlatched position and disposed proximate the anchorage 18 in the latched position.

The latch pin 54 may be secured in the unlatched position by rotating the latch pin 54 so that the handle portion 66 is disposed in the unlatch groove 60. Similarly, the latch pin 54 may be secured in the latched position by rotating the latch pin 54 so that the handle portion 66 is disposed in the latch groove 62.

One or more retaining pins 68 may extend through a portion of the first arm 34 to hold the latch pin 54 in the latch pin groove 52.

The first arm 34 and second arm 36 may be coupled in any suitable manner. In the embodiment shown in FIG. 1, the first arm 34 includes an arm engagement slot 70 disposed at an end. The arm engagement slot 70 is adapted to receive the second arm 36. In addition, coaxial holes 72 are disposed in the first and second arms 34,36. The coaxial holes 72 are adapted to receive a fastener 74. Alternatively, the first and second arms 34,36 may be integrally formed or coupled with an adhesive or welding.

Figure 4A:
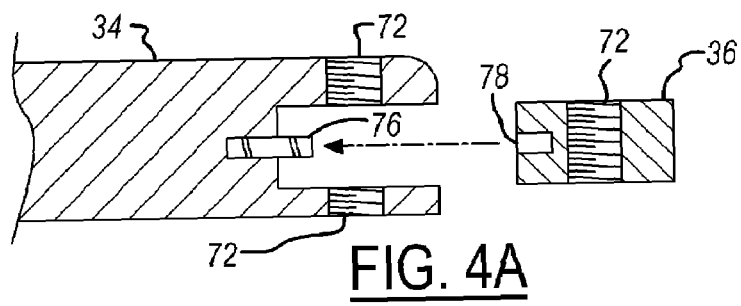
FIGS. 4A-4B are exploded section views of the apparatus along section line 4-4.
Figure 4B:
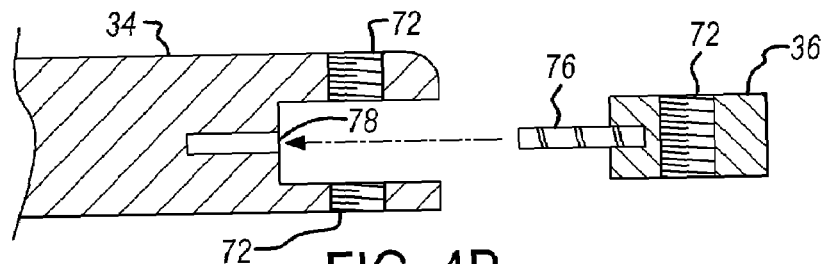

Referring to FIGS. 4A and 4B, two additional embodiments for coupling the first and second arms are shown. In FIG. 4A, the first arm 34 includes a pin 76 disposed proximate the arm engagement slot 70 and the second arm 36 includes an aperture 78 adapted to receive the pin 76. Alternatively, the arm engagement slot 70 may include an aperture 78 and the second arm 36 may include a pin 76 as shown in FIG. 4B. In addition, the second arm 36 may be configured with an arm engagement slot 70 adapted to receive the first arm 34 in any of the embodiments previously described.

Referring again to FIG. 1, the second arm 34 may include one or more adjustment mechanisms. The adjustment mechanisms are adapted to position the mounting assembly 30 and laser 32 at a desired position relative to the first and/or second anchorages 18,20. In FIG. 1, a first adjustment mechanism 80 and a second adjustment mechanism 82 are depicted. The adjustment mechanisms may have any suitable configuration. In this embodiment, the first and second adjustment mechanisms 80,82 are configured as threaded rods and extend through the second arm 36. The first and second adjustment mechanisms 82,84 may advance through the second arm 36 when rotated in a first direction and retract when rotated in an opposite direction.

The first and second adjustment mechanisms 80,82 may include first and second level mounts or end portions 84,86, respectively. The first and second end portions 84,86 may be configured to swivel or pivot to accommodate the contour of the seat bottom 16. In addition, the first and second adjustment mechanisms 80,82 may include knobs 88 disposed at an end opposite the end portions 84,86 to facilitate rotation.

A first level 90 may be disposed on the second arm 36 along a first axis 92 to indicate a roll angle of the apparatus 24. In the embodiment shown in FIG. 1, the first axis 92 extends parallel to the second arm 36. The first level 90 may be configured to indicate the orientation of the mounting assembly 30 relative to a plane 94 passing through the first and second anchorages 18,20. The first level 90 may be of any suitable type, such as a bubble level.

The laser mount 38 may be disposed proximate the second arm 36. In the embodiment shown in FIG. 1, the laser mount 38 includes an aperture 100 for receiving the laser 32 and a second level 102. The laser mount 38 may be attached to the second arm 36 in any suitable manner, such as with a fastener 104.

The laser 32 is adapted to project a beam 106. The laser 32 may be of any suitable type, such as a line projecting or line generating laser adapted to project a linear beam. For example, a 650 Nm 1 mW model ULL5-1G-650-90 line projecting laser manufactured by World Star Tech may be employed. Alternately, a laser that projects a beam that is manifested as a single point may be employed.

The second level 102 is disposed at a predetermined angle relative to the laser 32 and/or beam 106. More specifically, the second level 102 indicates when the apparatus 24 is positioned at a desired pitch angle for projecting the beam 106 toward the center line of the second anchorage 20. The pitch angle may be set relative to a horizontal plane. Moreover, the second level 102 and/or pitch angle may be disposed along a second axis 108 disposed perpendicular to the first axis 92. The pitch angle may be any suitable amount, such as at 30° relative to a horizontal plane. The second level 102 may be of any suitable type, such as a bubble level, and may be disposed in any suitable location. In the embodiment shown, the second level 102 is received by a notch or recessed portion 110 of the laser mount 38 to help position the second level 102 at the proper orientation relative to the laser 32. The second level 102 may be attached in any suitable manner, such as with an adhesive or fasteners.

The laser assembly 32 may also include a plug 120 for receiving power from a remote power source. Optionally, a portable power source may be incorporated with the apparatus 24.

The apparatus 24 may be reconfigured to accommodate different anchorage configurations. For example, the first arm 34 and laser mount 38 may be adapted to rotate with respect to the second arm 36. More specifically, the first arm 34 may be adapted to rotate about a first axis of rotation 130 and the laser mount 38 may be adapted to rotate about a second axis of rotation 132. For instance, the first arm 34 and laser mount 38 may be rotated 180° to point in the opposite direction from the configuration shown in FIG. 1. As such, the first arm 34 is adapted to engage the second anchorage 20 and the laser 32 is adapted to project a beam toward the first anchorage 18.

Other embodiments of the apparatus may be conceived in which the mounting assembly does not include first and/or second arms. For example, the laser could be attached directly to a single arm and oriented to project a beam toward the second anchorage. In such an embodiment, the adjustment mechanism could be a single adjustment rod.

Optionally, the first and second adjustment mechanisms 80,82 may be integrated with or substituted for at least one of the fasteners 74,104 that connect the laser 32 and first arm 34 to the second arm 36.

Figure 5:
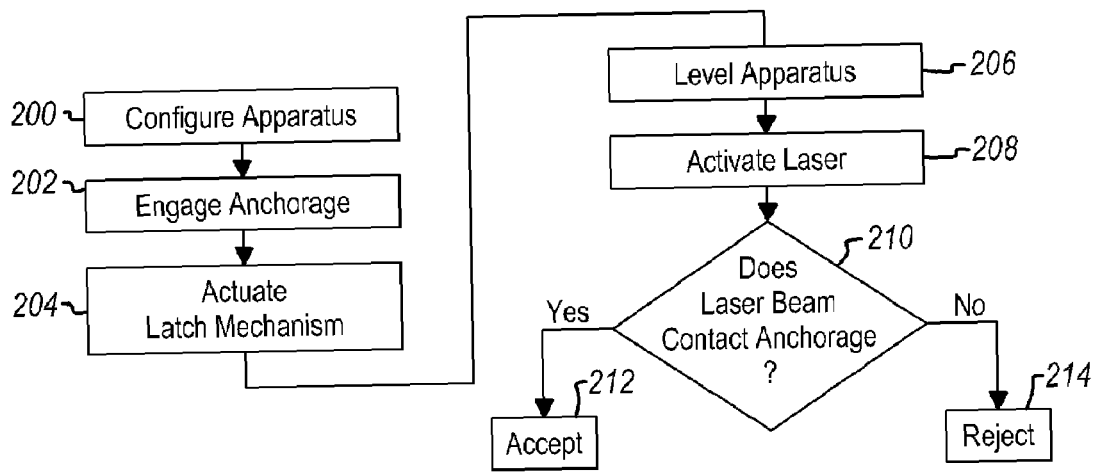
FIG. 5 is a flowchart of a method for assessing the visibility of an anchorage.

Referring to FIG. 5, a method for assessing the visibility of an anchorage with the apparatus 24 will now be described.

At 200, the apparatus is configured to accommodate a particular anchorage. More specifically, the first arm and laser are pivoted about the first and second axes of rotation, respectively, and secured to facilitate measurement of a particular anchorage configuration as previously described.

At 202, the apparatus is positioned to engage an anchorage. More specifically, the apparatus is positioned such that the slot engages an anchorage and the adjustment mechanism contacts the seat. The slot is engaged with the anchorage when the anchorage is seated against the slot. In addition, a portion of the arm may contact the seat back and/or seat bottom when engaged with the anchorage.

At 204, the latch mechanism is actuated to secure the apparatus to the anchorage. More specifically, the latch pin is actuated from the unlatched position to the latched position as previously described to inhibit non-rotational movement of the apparatus relative to the anchorages.

At 206, the apparatus is positioned in a desired location. More specifically, apparatus is positioned with the adjustment mechanisms so that the first and second levels indicate that the apparatus is oriented at a desired angle. Since the first and second levels are disposed at a predetermined angle relative to the beam and horizontal plane, the beam will be projected at a desired orientation toward the second or target anchorage.

At 208, the laser is activated to project a beam toward the target anchorage that is not engaged by the slot.

At 210, the visibility of the target anchorage is assessed. If the beam contacts the target anchorage, then the target anchorage is visible from the predetermined angle relative to the horizontal plane as shown in block 212. If the beam does not contact the target anchorage, such as when the beam contacts an overlapping portion of the seat back, then the target anchorage is not visible as shown in block 214.

While the best mode for carrying out the invention has been described in detail, those familiar with the art to which this invention relates will recognize various alternative designs and embodiments for practicing the invention as defined by the following claims.

What is claimed is:

1. An apparatus for assessing visibility of an anchorage disposed proximate a vehicle seat, the apparatus comprising:
   a mounting assembly adapted to engage a first a child restraint anchorage; and
   a laser adapted to project a beam toward a second child restraint anchorage and disposed proximate the mounting assembly;
   wherein the mounting assembly is pivotable about the first child restraint anchorage to adjust an angle at which the beam is projected toward the second child restraint anchorage.

2. The apparatus of claim 1 wherein the mounting assembly further comprises a slot adapted to receive the first child restraint anchorage.

3. The apparatus of claim 2 wherein the slot has a linear configuration.

4. The apparatus of claim 2 wherein the slot further comprises a hook portion having a different orientation than an adjacent portion of the slot.

5. The apparatus of claim 2 wherein the mounting assembly further comprises a latch mechanism having a groove disposed proximate the slot and a latch pin moveably disposed in the groove, the latch pin being adapted to move between a latched position in which the latch pin is disposed proximate the first child restraint anchorage and an unlatched position in which the latch pin is spaced apart from the first child restraint anchorage.

6. The apparatus of claim 1 wherein the laser is a line generating laser configured to project a linear beam.

7. The apparatus of claim 1 wherein the mounting assembly further comprises a first level disposed along a first axis and configured to indicate an a plane passing through the first child restraint anchorage and the second child restraint anchorage.

8. The apparatus of claim 7 wherein the mounting assembly further comprises an adjustment mechanism adapted to adjust the orientation of the first axis.

9. The apparatus of claim 7 further comprising a second level disposed along a second axis disposed perpendicular to the first axis and configured to indicate an orientation of the mounting assembly.

10. The apparatus of claim 9 wherein the adjustment mechanism is configured to adjust the orientation of the second axis.

11. An apparatus for assessing visibility of a child restraint anchorage of a child restraint anchorage system disposed proximate a seat of a vehicle, the apparatus comprising:
   a mounting assembly including:
      a first arm having a slot configured to engage a first child restraint anchorage;
      a second arm disposed proximate the first arm;
      a laser mount disposed proximate the second arm; and
      an adjustment mechanism adapted to adjust the position of the laser mount relative to the first child restraint anchorage; and
   a laser disposed proximate the laser mount and adapted to project a beam toward a second child restraint anchorage.

12. The apparatus of claim 11 wherein the adjustment mechanism further comprises first and second adjustment rods disposed proximate the second arm, the first and second adjustment rods being adjustably positionable relative to the second arm and having first and second end portions, respectively, adapted to contact the seat.

13. The apparatus of claim 11 wherein the mounting assembly further comprises a first level disposed proximate the second arm and configured to indicate an orientation of the second arm relative to a plane disposed parallel to the first child restraint anchorage and the second child restraint anchorage.

14. The apparatus of claim 11 wherein the mounting assembly further comprises a second level disposed proximate the laser mount.

15. The apparatus of claim 11 wherein the laser is a line generating laser configured to project a linear beam.

16. The apparatus of claim 11 wherein the first arm is adapted to rotate about a first axis of rotation and the laser is configured to rotate about a second axis of rotation to reconfigure the apparatus such that the slot is configured to engage the second child restraint anchorage and the laser is configured to project a beam toward the first anchorage.

17. The apparatus of claim 11 wherein the first arm includes an arm engagement slot and a pin disposed within the arm engagement slot, and the second arm includes a hole adapted to receive the pin, wherein the arm engagement slot is configured to receive the second arm and the pin and hole cooperate to inhibit rotational movement of the second arm relative to the first arm.

18. The apparatus of claim 11 wherein the second arm includes a pin and the first arm includes an arm engagement slot adapted to receive the second arm and a hole disposed proximate the arm engagement slot, wherein the pin and hole cooperate to inhibit rotational movement of the second arm relative to the first arm.

19. A method for assessing the visibility of a child restraint anchorage of a child restraint anchorage system disposed on vehicle with an apparatus having a mounting assembly adapted to engage a first child restraint anchorage and a laser adapted to project a beam toward a second child restraint anchorage, the method comprising:
   engaging the mounting assembly to the first child restraint anchorage;
   positioning the mounting assembly at a predetermined angle;
   projecting the beam toward the second child restraint anchorage; and
   determining whether the beam contacts the second child restraint anchorage.

20. The method of claim 19 wherein the second child restraint anchorage is visible from the predetermined angle if the beam contacts the second child restraint anchorage.

* * * * *